Sept. 20, 1960      J. C. OWEN      2,953,328
AIRCRAFT CONTROL SYSTEM
Filed Jan. 13, 1956
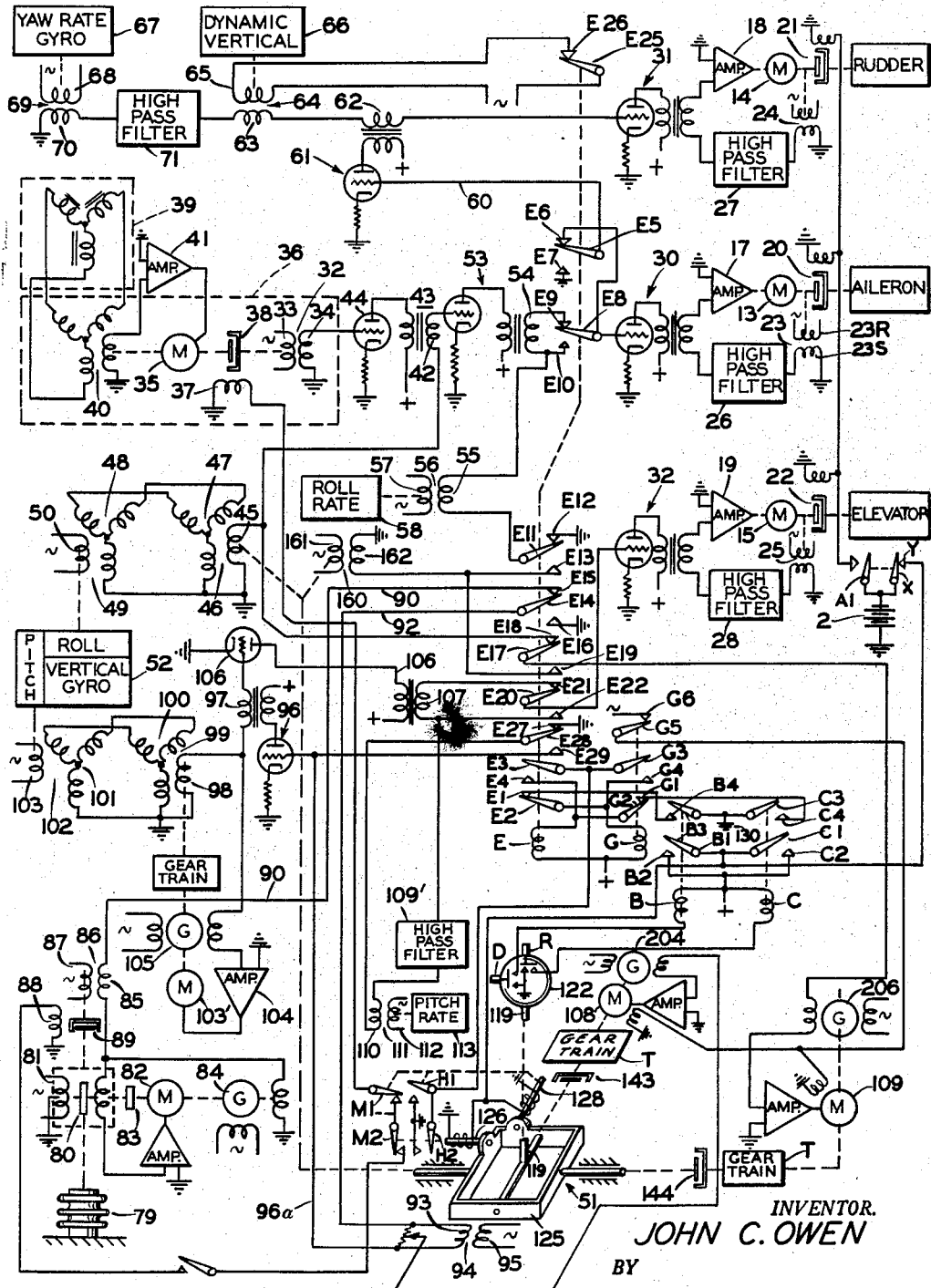
INVENTOR.
JOHN C. OWEN
BY
Oscar B Brumback
ATTORNEY United States Patent Office 2,953,328
Patented Sept. 20, 1960

2,953,328

AIRCRAFT CONTROL SYSTEM

John C. Owen, Grand Rapids, Mich., assignor to The Bendix Corporation, a corporation of Delaware Filed Jan. 13, 1956, Ser. No. 559,063

12 Claims. (Cl. 244—77)

This invention relates to automatic control systems for aircraft.

Automatic aircraft control systems generally detect the deviations of a craft from a predetermined condition and apply a corresponding action to the craft to correct for the deviation. The system may be engageable and disengageable from control of the craft, and a controller is usually provided to change the condition of the craft by executing coordinated turns and climbs or dives of moderate extent upon the displacement of the controller from a normal position. Before the initial engagement of such a system, the manual controller and any trim knobs are normally centered and the craft manually trimmed for the desired flight attitude; after this engagement, the control system will maintain the craft in the attitude existing at the time of engagement. Should the controller or trim knobs not be centered at the time of engagement, the human pilot must either control the attitude of the aircraft about an off-normal position of the controller or else correct the condition by disengaging the control system, returning the controller or trim knob to normal position, and reengaging the control system.

Displacement of the manual controller in the heretofore known systems developed a signal to maneuver the craft about the pitch, roll or yaw axis until an attitude signal developed by a reference device, such as a vertical or direction gyro, became equal and opposite to the controller signal. The attitude of the craft at this time had been changed to an extent corresponding to the extent of controller displacement. This presented the disadvantage that when an attitude displacement reference such as a vertical gyro was used to develop the attitude signals, maneuvers of the craft were limited; a vertical gyro, for example, having definite limits or stops which prevent its use as a reference sensor for acrobatic maneuvers.

An object of the present invention, therefore, is to provide a novel craft control system wherein centering of the controller prior to engagement of the system for control of the craft is not required.

Another object is to provide a novel control system wherein the position of the manual controller for the system is synchronized with the attitude of the aircraft during the time the craft is not under the control of the control system.

A further object is to provide a novel control system for maneuvering a craft about an axis selectively to the extent of displacement or at a rate of displacement commanded by a manual controller.

Another object is to provide a novel control system wherein a centering force is applied to the manual controller and tends to return the controller to a center position during a commanded rate of displacement maneuver.

Still another object is to provide a controller for an automatic control with servo subsystem which, in one condition of operation, is responsive to displacement of the controller from center position for returning the controller to this center position.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for the purpose of illustration and description only, and is not intended as a definition of the limits of the invention.

The single sheet of drawing illustrates schematically an aircraft control system according to the invention.

In the novel control system illustrated, when a switch A1 is in the open position illustrated, the magnetic clutches 20, 21 and 22 which engage servomotors 13, 14 and 15 for the control of the aileron, rudder and elevator surfaces, respectively, are deenergized. When the switch is moved to a closed position, the clutches are energized from a suitable source such as battery 2 to engage the servomotors with the control surfaces. These servomotors operate in response to the output of respective amplifiers 17, 18 and 19 in the roll, yaw and pitch control channels. The amplifiers and servomotors may be identical and may advantageously be of the type described in United States Patent No. 2,625,348, issued January 13, 1953, to P. A. Noxon et al.

So that the extent of motor operation and surface displacement will correspond to the extent of error from reference condition, each servomotor is mechanically coupled to actuate a follow-up inductive device 23, 24 or 25 which develops a signal that is fed back to the amplifiers in degenerative fashion. While these follow-up signals are desirable for transient surface displacement, they are not desirable for the sustained surface displacements that may be necessary to trim the craft during change in trim conditions. High pass filters 26, 27 and 28, therefore, are provided to reduce or eliminate the sustained or low frequency follow-up signals yet not appreciably affect the transient or high frequency signals. These filters may be of the type described in co-pending application Serial No. 90,236, assigned to the assignee of the present invention, now U.S. Patent No. 2,754,418.

Isolation and coupling stations 30, 31 and 32 couple the other signals of the signal chain to the amplifier inputs. While stations such as described in my copending application Serial No. 535,873, now U.S. Patent No. 2,842,731, may be employed advantageously for isolating the various portions of the signal chain and for adjusting the control signal for a parameter of flight at the same time, conventional stations are illustrated herein as comprised of a triode and a coupling transformer for the purposes of simplicity.

Turning now to the roll control channel, the heading error signal is derived from an inductive signal device 32 in a compass and master direction indicator arrangement 36 which may be of the type described in U.S. Patent No. 2,674,423, issued April 6, 1954, to P. A. Noxon. In the arrangement herein, an earth inductor compass 39 as a transmitter operates motor 35 through a receiver inductive device 40 and amplifier 41 to maintain the rotor of inductive device 40 at null. Motor 35 also displaces rotor 33 of inductive device 32 relative to a stator 34 to develop a heading error signal when the coil 37 of a magnetic clutch 38 is energized. The phase and amplitude of this heading signal corresponds to the direction and extent of displacement of the craft from the heading of the craft at the time clutch 38 was engaged. This signal is applied across the secondary winding 42 of a transformer 43 by way of a vacuum tube 44, the vacuum tube and transformer constituting an isolation and coupling station.

To add a roll attitude displacement error signal to the heading error signal, one terminal of secondary winding 42 is connected to the rotor 45 of a receiver inductive device 46 whose stator 47 is connected to the stator 48 of a transmitter inductive device 49 having a rotor 50. Rotors 45 and 50 are positioned in a well known manner through a suitable linkage by a manual controller 51 and a conventional vertical gyro 52, respectively. As long as these rotors are in positional agreement, no signal is developed at rotor 45; however, a relative displacement of the rotors develops at rotor 45 a signal corresponding in phase and amplitude to the direction and extent of displacement of the craft from a commanded attitude. This roll attitude displacement signal is combined with the heading error signal at secondary winding 42.

The combined signal from secondary winding 42 is applied by way of an isolation and coupling station 53 to a secondary winding 54 which has one end connected to the stator 55 of an inductive device 56. The rotor 57 of inductive device 56 is displaceable in a known manner by a conventional rate of roll gyro 58 to develop at stator 55 a signal corresponding in phase and amplitude to oppose the direction and rate of displacement signals. Thus, a signal corresponding to the rate of attitude displacement is added to the signals corresponding to the extent of attitude displacement and heading error at secondary winding 54.

By way of contact E9 and armature E8 the combined heading error, attitude error and rate signals are transmitted to the isolation and coupling station 30 and applied to the input of amplifier 17 along with the follow-up signal from inductive device 23. A portion of the combined signal is also applied as a cross feed, to the yaw control channel by way of lead 60 and an isolation and coupling station 61, the signal appearing across secondary winding 62 in the yaw control channel.

In the yaw control channel, one end of secondary winding 62 is connected to the stator 63 of an inductive device 64 whose rotor 65 is displaceable by a conventional dynamic vertical sensor 66. Thus, a slipping or skidding of the craft, as determined by the displacement of the apparent vertical from the normal vertical, results in the displacement of rotor 65 to develop a corresponding signal at stator 63. To the latter signal is added a signal corresponding to the rate of turn of the craft.

A conventional rate of turn gyro 67 responds to the turning of the craft about the yaw axis and displaces the rotor 68 of inductive device 69 relative to stator 70. Since the yaw rate gyro also responds to the turning of the craft about its axis and about a point in space, the signal developed at stator 70 contains several components; the turning of the craft about its own axis developing a signal of short duration, and the turning of the craft about a point in space developing a signal of sustained duration. A high pass filter 71, which may be identical to filters 26, 27 and 28, removes the sustained signal from the signal chain.

The pitch control channel of the system may be generally similar to the pitch control channel described in my copending application Serial No. 535,858 now U.S. Patent No. 2,873,418, which is assigned to the assignee of the present invention. In the embodiment herein, a rate of climb or dive responsive device provides the basic reference signal and comprises a conventional aneroid 79 for displacing a slug 80 relative to a balanced transformer 81 and a servosystem for rebalancing the transformer. When slug 80 is displaced, transformer 81 is unbalanced, and the resulting signal is applied through a conventional amplifier to a motor 82. Through a suitable gear train 83, motor 82 drives the transformer to a new balanced condition and, at the same time, drives a conventional rate generator 84 to develop a signal corresponding in phase and amplitude to the direction and rate of motor operation. Since motor 82 seeks to maintain transformer 81 in a balanced condition, the rate of motor operation is proportional to the rate of climb or dive of the craft. Thus, the signal from generator 84 corresponds in phase and amplitude to the rate of climb or dive. This signal is transmitted to the stator 85 of an inductive device 86.

When coil 88 of magnetic clutch 89 is energized, the rotor 87 of inductive device 86 is positioned by motor 82. Thus, the signal from stator 85 corresponds in phase and amplitude to the direction and extent of the error or difference between the altitude of the craft and the altitude at which clutch 89 is energized. This signal combination is applied by way of lead 90, armature E14, and lead 92 to the stator winding 93 of an inductive device 94 whose rotor 95 is connected to the pitch axis trunnion of the manual controller 51. The signal combination is applied by way of a lead 96a coupling station 96 to a secondary winding 97 whose one end is connected to the rotor 98 of an inductive device 99.

At inductive device 99, a pitch attitude signal is provided for short time stabilization since the attitude of an aircraft can be changed at a rate greater than the rate of climb or dive can be changed. Stator 100 of inductive receiver device 99 is connected to the stator 101 of transmitter inductive device 102 whose rotor 103 is positioned by vertical gyro 52. Rotor 98 of inductive device 99 is also positioned by a motor 103' which moves rotor 98 to cancel any signal from the vertical gyro after a short period of time, the output from rotor 98 being also applied through an amplifier 104 to the motor so that the motor turns the rotor to correct any error in position existing between rotors 98 and 103. A conventional rate generator 105 provides a feed back signal to the amplifier to determine the rate at which rotor 98 is driven to cancel the signal. The signal combination from secondary winding 97 is applied by way of a coupling station 106 to a secondary winding 107.

One end of secondary winding 107 is connected to coupling station 32 and the other end is connected through a high pass filter 109' to the stator 110 of an inductive device 111 whose rotor 112 is actuated by a conventional rate gyro 113 in response to the rate of turning of the craft about the pitch axis. Thus, the signal combination is applied through isolation station 32 to the elevator servo amplifier 19 along with the follow-up signal from inductive device 25.

The foregoing automatic control system will maintain the craft in straight and level flight and on a predetermined heading. In accordance with the present invention, a manual controller is provided so that upon displacement of the controller from center position, the craft may be maneuvered selectively either to an extent or at a rate corresponding to the extent of controller displacement. An interlock prevents both selections from being made at the same time and prevents any selection from being made until after the stick is centered.

Controller 119 may be constructed as described in detail in copending application Serial No. 559,064 of Francis Henry S. Rossire, assigned to the assignee of the present invention. As illustrated schematically herein, one end of the controller is shaped to provide a knob like grip 122 having selection buttons R and D and the other end is attached to a gimbal frame 125.

Normally, gimbal frame 125 is locked in centered position by a pair of solenoid operated detents 126 and 128. Depressing either the rate button R or the displacement button D, releases the frame and provides for universal movement of controller 119. Depending upon the button R or D depressed, a circuit is completed to energize either a relay B or C, which then pulls its armatures downwardly from the position shown. The engagement of either of the armatures B1 or C1, which are connected in parallel to the solenoids of the detents, with a related parallel connected contact B2 or C2 withdraws the detents from their slots so that the controller may be moved manually from the centered position. In addition, depressing button D or R energizes a respective solenoid E or G, an interlock insuring that both solenoids E and G will not be energized at the same time.

To provide the interlock, solenoid E is energized through a circuit traced from ground 130, armature C3, contact C4, contact G1, armature G2, solenoid E and the energy source, and solenoid G is energized through a circuit traced from ground 130, armature B3, contact B4, contact E1, armature E2, solenoid G, and the energy source. Due to this cross connection, solenoid E cannot be energized if solenoid G is energized and solenoid G cannot be energized if solenoid E is energized.

Since the buttons D and R are depressed only momentarily, holding circuits for continuing the energization of solenoids E and G are completed as detents 126 and 128, in their withdrawal from their slots in frame 125, move switch arms H1 and H2 to a closed circuit position and complete a circuit through a solenoid E or G. Since the detents ride on the cam surface of the frame during displacement of the controller, the detents keep the switches H1 and H2 in a closed circuit position even though solenoids 126 and 128 are also deenergized as solenoids B and C are deenergized.

To control the craft in a manner such that the extent of displacement of the craft will correspond to the extent of displacement of the controller, button D is depressed while controller 119 is centered. This energizes solenoid B, so that armatures B1 and B3 engage contact B2 and B4, detents 126 and 128 are pulled from their slots, and solenoid G is energized by way of contact E1 and armature E2. Armature G2 disengaging from contact G1 prevents the subsequent energization of solenoid E until after the controller 119 is recentered; and switch H1 and H2 being moved to a closed circuit position by detents 126 and 128 maintain solenoid G energized by way of armature G3 and contact G4 as long as the displacement of controller 119 from its centered position causes the detents 126 and 128 to ride on the surface of frame 125. As the detents also move switches M1 and M2 to an open position, the circuit to clutch energization coil 37 in the heading control and coil 88 in the altitude control is opened deenergizing the coils to render the heading and altitude controls ineffective on the craft.

After depressing button D, lateral displacement of the controller displaces rotor 45 of inductive device 46 relative to its stator 47 to develop at rotor 45 a signal corresponding in phase and amplitude to the direction and extent of the error between the commanded and measured roll attitude. This error signal is applied through isolation stations 53 and 30 to amplifier 17.

Depending upon the phase of the error signal to amplifier 17, motor 13 will displace the aileron surface in a clockwise or counter-clockwise direction until the attendant displacement of rotor 23R relative to stator 23S of inductive device 23 develops at stator 23S a signal equal and opposite to the roll attitude signal. At this time, the net input signal to amplifier 17 is zero and motor 13 stops with the surface displaced, and the displaced surface changes the roll attitude of the craft. As the rotor 50 that is positioned by the vertical gyro is brought into agreement with the position of rotor 45, the attitude error signal decreases to zero. At this time, the follow-up signal from inductive device 23 prevails to return the aileron surface to the normal streamlined position.

The attitude error signal from the roll channel is also applied through an isolation stage 61 to the yaw signal chain to aid in coordinating the turn. This cross feed signal, being a transient signal since it disappears as the measured attitude approaches the commanded attitude, is applied through isolation station 31 to amplifier 18 which detects the phase of the signal and operates motor 14 to displace the rudder surface in a direction to coordinate the turn of the craft.

If the turn of the craft is coordinated, the dynamic vertical and the normal vertical of the craft coincide; but if the turn is not coordinated, the dynamic vertical and the normal vertical are displaced, and the craft tends to slip or skid. In response to the displacement between dynamic and normal verticals, a dynamic vertical sensor 66 actuates rotor 65 of inductive device 64 to develop at stator 63 a signal corresponding in phase and amplitude to the direction and extent of displacement. This signal further actuates motor 14 to coordinate the turn.

Yaw rate gyro 67 responds to the rate of turning about the yaw axis developed as the craft turns and displaces rotor 68 to develop at stator 70 of inductive device 69 a signal corresponding to the rate of turning of the craft. Since the deviations of the craft about its axis are transient, the signal is of short duration. The yaw rate gyro, however, also tends to respond to the turning of the craft about a geographical center and displaces rotor 68 to develop a sustained signal corresponding to this rate. A high pass filter 71 is provided to eliminate this sustained signal so that substantially only the short period signal operates servomotor 14. The rate of turn signals tend to prevent the craft from overrunning the assigned position.

After depressing button D, a longitudinal displacement of controller 119 in the fore and aft direction actuates rotor 95 of inductive device 94 to develop at stator 93 a signal corresponding in phase and amplitude to the direction and extent of the displacement. This displacement signal is combined with the rate of climb or dive signal from rate generator 84, so that the combined signal corresponds to the error between the ordered and measured rates of climb or dive. This error signal is applied through stations 96, 106 and 32 to the pitch channel amplifier 19 to operate motor 15 to displace the elevator surfaces in a direction so as to cause the measured and commanded rates of climb or dive to agree. Motor 15 continues to displace the surface until the signal developed at follow-up device 25 is equal and opposite to the error signal applied by coupling station 29. At this time, the net input signal to amplifier 19 is zero and the motor stops with the elevator surface displaced.

Since the pitch attitude of the craft can be changed at a greater rate than the rate of climb or dive can be changed, the pitch attitude signal is used for short time stabilization. To this end, the signal corresponding to the error in the positions of rotor 103 of the transmitter inductive device 102 and the rotor 98 of inductive receiver device 99 is applied to the signal chain to motor 15 so that the rate of climb or dive error signal is opposed by the attitude signal. The attitude signal also operates motor 103' and as the motor brings the receiver rotor 98 into agreement with the transmitter rotor 103, the actual rate of climb approaches the commanded rate of climb and the error signal is reduced to zero. The follow-up signal prevails at this time to return the elevator surfaces to their normal streamlined position.

The disengagement of armature G5 from contact G6 upon the energization of solenoid G removes excitation from the fixed phase of motors 108 and 109. Thus, when the controller is displaced after button D has been depressed, friction clutches 143, 144 and irreversible gear trains T hold the controller in its displaced position so that the controller must be returned to center manually to return the craft to level flight attitude.

The foregoing has described the operation of the automatic control system when the controller is operated in such a manner that the extent of change of attitude corresponds to the extent of displacement of the controller. The controller may also be operated so that the rate of change of attitude corresponds to the extent of displacement of the controller. To this end, rate button R is depressed when controller 119 is at center position to energize solenoids C and E pulling their armatures downwardly from the position shown. The resulting engagement of armature C1 and contact C2 energizes solenoid operated detents 126 and 128 to release the controller gimbal frame 125, and the engagement of armature C3 and contact C4 energizes solenoid E by way of contact G1 and armature G2. The closing of switch arms H1 and H2 by the released detents of solenoid operated detents 126 and 128 maintains solenoid E energized by way of armature E3 and contact E4.

Upon the energization of solenoid E, the disengagement of armature E5 from contact E6 and its engagement with contact E7 removes the cross feed signal from the roll to the yaw channel. The disengagement of armature E8 from contact E9 and the engagement with contact E10 removes the heading and roll attitude signals from the aileron signal chain. The disengagement of armature E11 from contact E12 and the engagement with contact E13 places into the aileron signal chain the signal from inductive device 160. The disengagement of armature E14 from contact E15 and the engagement with contact E16 removes the rate of climb signal from the pitch channel and provides a ground for the stator 93 of inductive device 94. The disengagement of armature E17 from contact E18 and engagement with contact E19 places motor 109 under the control of inductive device 160. The disengagement of E20 from contact E21 and engagement with contact E22 places servomotor 15 under the control of the pitch rate inductive device 111.

Lateral displacement of the controller after button R has been displaced, displaces rotor 161 of inductive device 160 to develop at stator 162 a signal corresponding in phase and amplitude to the direction and extent of controller displacement. This signal by way of contact E13, armature E11, contact E10, armature E8 and station 30 operates motor 13 until follow-up device 23 develops an equal and opposite signal. As the displaced surface rolls the craft, the craft experiences a rate of turning about the roll axis such that the signal developed at inductive device 56 by the rate of roll gyro 58 becomes equal and opposite to the signal of inductive device 160. Thus, the signal fed to the isolation and coupling station 30 is the difference between the commanded rate of roll and the measured rate of roll, and as this net signal becomes zero, the signal from the follow-up device 23 prevails to return the ailerons to their normal streamlined position. The disengagement of armature E25 from contact E26 removes the excitation from the rotor 65 of inductive device 64. Thus, as the ailerons bank the craft, no signal is developed at stator 63 to coordinate the turn. Any tendency of the craft to turn about the yaw axis develops a rate signal at inductive device 69 to operate motor 14 to oppose the turning. Thus, the craft may be rolled about the roll axis without a corresponding turning about the yaw axis.

If controller 119 is displaced in the fore and aft direction after button R has been depressed, the signal from inductive device 94 is applied to servomotor 15 to displace the elevator surface until the follow-up signal from inductive device 25 becomes equal and opposite. As the displaced elevator surface places the craft in a pitch attitude such that the rate of pitch causes the pitch rate gyro to actuate signal device 11 to develop a signal equal and opposite to the signal from the inductive device 94, the signal chain becomes balanced. At this time the follow-up signal from inductive device 25 prevails to return the craft surface to its normal streamlined position.

During displacement of the controller after the selection button R has been displaced, servomotor 109 operates in response to the signal from inductive device 160 and servomotor 108 in response to the signal from inductive device 94 through the friction clutches 144 and 143, respectively, to continually urge the controller to center position. The human pilot must hold controller 119 in displaced position against the torque exerted by the motors through the friction clutches, and the servomotor returns the controller to center position when the human pilot releases the controller and returns the signal devices to zero. Rate generators 204 and 206 damp the motor operation.

When switch A1 is moved to the position shown, and the craft is maneuvered directly by a conventional manual control magnetic clutches 20, 21 and 22 are deenergized and servomotors 13, 14 and 15 are disengaged from the control surface. Switch X engages contact Y at this time to energize solenoids 126 and 128 to withdraw the detents and release frame 125. Armature E17 is in the position shown so that any signal, due to a change in attitude causing an error in the position of rotors 45 and 50, is applied by way of contact E18 and armature E17 to drive motor 109 to displace the controller and rotor 45 to reduce the signal to zero. Similarly, any signal applied to motor 108 operates the motor to displace frame 125 of rotor 95 of inductive device 94 to reduce the signal input to zero. Thus, the position of the controller is synchronized with the attitude of the craft so that the automatic control system may be engaged to control the craft without transient effects.

Moving switch A1 to a closed position energizes clutches 20, 21 and 22 to engage the respective servomotors and surfaces. This also disengages armature X from contact Y and deenergizes solenoids 126 and 128. If controller 119 is not centered at this time, attitude control clutch 89 and heading control clutch 38 will not be engaged. The craft will be maintained in its existing attitude, and to bring the craft to straight and level flight, it will be necessary to return the controller to center position.

The foregoing has presented a novel automatic control system for aircraft wherein the movement of a controller from a normal position for maneuvering the craft selectively to an extent or at a rate corresponding to the extent of controller movement with interlocks prevents a simultaneous selection of both. When the craft is to be maneuvered to an extent corresponding to the extent of controller displacement, the controller remains in its last displaced position; but, when the craft is to be maneuvered at a rate corresponding to the extent of craft displacement, the controller must be held in its displaced position and, upon release, is automatically returned to center position. When the craft is being maneuvered manually directly, the controller follows the maneuvers of the craft just as if the controls were controlling the craft. Thus, the automatic control system may be operatively connected to control the craft at any time without transient effects.

Although but one embodiment of the invention has been illustrated and described, various changes can be made in the design and arrangement of the parts without departing from the spirit and scope of the invention as the same will now be understood by those skilled in the art.

I claim:

1. A control system for an aircraft comprising a movable controller, power means for maneuvering said craft, and means for selecting the operation of said power means upon movement of said controller to maneuver said craft to an extent corresponding to the extent of said movement or at a rate corresponding to the extent of said movement.

2. A control system for an aircraft comprising a movable controller, power means for maneuvering said craft, means for selecting the operation of said power means upon movement of said controller to maneuver said craft to an extent corresponding to the extent of said movement or at a rate corresponding to the extent of said movement, and means for preventing a selection of both maneuvers at the same time.

3. A control system for aircraft comprising power means for maneuvering said craft, a controller, locking means normally locking said controller in center position, first means operable upon movement of said controller to actuate said power means to maneuver said craft to an extent corresponding to the extent of movement of said controller from center position, second means operable upon movement of said controller to actuate said power means to maneuver said craft at a rate corresponding to the extent of movement of said controller from center position, and means on said controller for releasing said locking means and rendering one of said first and second means effective on said power means.

4. A control system for an aircraft comprising a controller movable from a normal position, power means for maneuvering said craft, selection means operable for selecting the operation of said power means upon movement of said controller from center position to maneuver said craft to an extent corresponding to the extent of said movement or at a rate corresponding to the extent of said movement and means preventing operation of said selection means to change the selection unless said controller is in a normal position.

5. A control system for an aircraft comprising a controller movable from a normal position, power means for maneuvering said craft, means for selecting the operation of said power means upon movement of said controller from center position to maneuver said craft to an extent corresponding to the extent of said movement or at a rate corresponding to the extent of said movement, and means operable upon said selection for maintaining said controller in its moved position for one selection and upon the other selection for automatically returning said controller to said normal position.

6. A control system for an aircraft, comprising a movable controller, a servomotor for actuating the surface of said craft to maneuver the craft, first means for operating said servomotor upon movement of said controller so that said craft is maneuvered to an extent dependent upon the extent of said movement, second means for operating said servomotor upon movement of said controller for maneuvering said craft at a rate dependent upon the extent of said movement, and means for selectively rendering one of said first and second means effective on said servomotor.

7. A control system for an aircraft, comprising a movable controller, power means for actuating the surfaces of said craft to maneuver the craft, first means for operating said power means upon movement of said controller so that said craft is maneuvered to an extent dependent upon the extent of movement of said controller, second means connecting said controller and said power means for maneuvering said craft at a rate dependent upon the extent of said movement, and means for permitting a selected one of said first and second means to be operative on said power means.

8. A control system for an aircraft, comprising a movable controller, power means for actuating the surfaces of said craft to maneuver the craft, first means for operating said power means upon movement of said controller so that said craft is maneuvered to an extent dependent upon the extent of movement of said controller, second means connecting said controller and said power means for maneuvering said craft at a rate dependent upon the extent of said movement, means for rendering one of said first and second means operative on said power means, means for maintaining said controller in its last position when said first means is rendered operative, and means operable for returning said controller to normal position when said second means is rendered operative.

9. A control system for an aircraft comprising first reference means for developing a displacement signal corresponding to the extent of displacement of the craft about an axis, second reference means for developing a rate signal corresponding to the rate of displacement of said craft about an axis, a manual controller for developing a command signal, power means for moving a control surface to displace said craft about said axis, and means for selectively operating said power means by the difference between said command and displacement signal and said command and rate signal.

10. An automatic control system for a craft comprising power means for maneuvering said craft, manual control means for developing a first signal for actuating said power means, attitude reference means for developing a second signal corresponding to the extent of change in attitude of the craft from a predetermined attitude, rate reference means for developing a third signal corresponding to the rate of change of attitude of the craft, and means combining said signals so that said power means is selectively actuated until said first and second signals balance or said first and third signals balance.

11. In the steering system of an aircraft having first means for manually directly controlling the craft and second means for automatically controlling the craft, said second means including a controller for commanding an attitude to be automatically maintained, means for developing a signal corresponding to the error between the commanded and measured attitudes of the craft, and means responsive to said signal for positioning said controller to maintain said signal at zero when said craft is under control of said first means whereby control may be shifted from said first means to said second means without transient effects.

12. A control system for an aircraft comprising a yaw control channel including power means for operating a yaw control surface and signal means for operating said power means to coordinate turns of the craft, a roll control channel for controlling the craft about the roll axis including power means for operating a roll control surface, means for developing a signal corresponding to the error between a commanded roll attitude and the measured roll attitude, means for developing a signal corresponding to the error between a commanded rate of change of roll attitude and the measured rate of change of roll attitude, selection means for rendering one or the other of said error signals effective on said roll surface, control power means and means for cross feeding said first named error signal to operate said yaw control surface power means when said first named error signal controls said roll control surface power means.

References Cited in the file of this patent

UNITED STATES PATENTS

| | | |
|---|---|---|
| 2,464,629 | Young | Mar. 15, 1949 |
| 2,555,019 | Webb | May 29, 1951 |
| 2,621,003 | Meredith | Dec. 9, 1952 |
| 2,686,021 | Halpert | Aug. 10, 1954 |
| 2,740,082 | Sedgfield | Mar. 27, 1956 |